(12) United States Patent
Ding et al.

(10) Patent No.: US 10,645,001 B2
(45) Date of Patent: May 5, 2020

(54) INFORMATION TRANSMISSION METHOD AND APPARATUS, DEVICE AND STORAGE MEDIUM

(71) Applicant: Xiaomi Inc., Beijing (CN)

(72) Inventors: Yi Ding, Beijing (CN); Deguo Meng, Beijing (CN); Enxing Hou, Beijing (CN)

(73) Assignee: Xiaomi Inc., Beijing (CN)

( * ) Notice: Subject to any disclaimer, the term of this patent is extended or adjusted under 35 U.S.C. 154(b) by 49 days.

(21) Appl. No.: 15/239,104

(22) Filed: Aug. 17, 2016

(65) Prior Publication Data
US 2017/0126556 A1    May 4, 2017

(30) Foreign Application Priority Data
Oct. 28, 2015  (CN) .......................... 2015 1 0713505

(51) Int. Cl.
*H04W 40/24* (2009.01)
*H04L 12/721* (2013.01)
(Continued)

(52) U.S. Cl.
CPC .............. *H04L 45/66* (2013.01); *H04L 45/26* (2013.01); *H04W 40/246* (2013.01); *H04W 40/32* (2013.01); *H04L 61/6022* (2013.01)

(58) Field of Classification Search
CPC ..... H04L 45/66; H04L 45/26; H04L 61/6022; H04W 40/246; H04W 40/32;
(Continued)

(56) References Cited

U.S. PATENT DOCUMENTS 7,356,032 B1 *  4/2008  Sumorok .......... H04L 29/12028
                                                   370/392
8,705,553 B2    4/2014  Rune
(Continued)

FOREIGN PATENT DOCUMENTS

CA      2 630 505 A1    7/2007
CA      2 741 885 A1    4/2011
(Continued)

OTHER PUBLICATIONS

Notice of Reasons for Rejection dated May 12, 2017 in Korean Patent Application No. 10-2016-7010355.
(Continued)

*Primary Examiner* — Un C Cho
*Assistant Examiner* — Lalita W Pace
(74) *Attorney, Agent, or Firm* — Oblon, McClelland, Maier & Neustadt, L.L.P.

(57) ABSTRACT

The present disclosure relates to an information transmission device and apparatus, a device and a storage medium. The method includes receiving a message from a source terminal device, the message including message data and a target terminal device identification; determining whether the target terminal device identification exists in a transmission list, the transmission list including identifications of terminal devices accessing an access point device, and the access point device being an access point device corresponding to the source terminal device; and sending the message data to the target terminal device if the target terminal device identification exists in the transmission list.

15 Claims, 11 Drawing Sheets

(51) Int. Cl.
  *H04W 40/32*   (2009.01)
  *H04L 29/12*   (2006.01)
(58) Field of Classification Search
  CPC ..... H04W 48/20; H04W 92/10; H04W 48/18; H04W 4/005; H04W 88/04; H04W 36/0061; H04W 36/0083; H04W 8/005; H04W 84/02; H04W 84/12
  See application file for complete search history.

(56) References Cited

U.S. PATENT DOCUMENTS

| | | | |
|---|---|---|---|
| 8,837,395 B2 | 9/2014 | Sories et al. | |
| 9,021,072 B2 | 4/2015 | Atreya et al. | |
| 9,667,485 B2* | 5/2017 | Murphy | H04W 12/06 |
| 2006/0159073 A1* | 7/2006 | Chun | H04L 29/06027 370/352 |
| 2006/0256769 A1* | 11/2006 | Cho | H04L 1/0057 370/351 |
| 2007/0097945 A1* | 5/2007 | Wang | H04L 45/12 370/349 |
| 2008/0259788 A1 | 10/2008 | Wang et al. | |
| 2009/0221287 A1 | 9/2009 | Balasubramanian et al. | |
| 2011/0182227 A1 | 7/2011 | Rune | |
| 2011/0185049 A1 | 7/2011 | Atreya et al. | |
| 2011/0296719 A1 | 12/2011 | Sories et al. | |
| 2013/0136117 A1* | 5/2013 | Schrum, Jr. | H04W 88/06 370/338 |
| 2014/0146739 A1* | 5/2014 | Zhang | H04W 92/20 370/315 |
| 2014/0219242 A1 | 8/2014 | Perras et al. | |
| 2015/0245278 A1* | 8/2015 | Scahill | H04W 12/08 370/329 |
| 2015/0271813 A1 | 9/2015 | Kim et al. | |

FOREIGN PATENT DOCUMENTS

| | | |
|---|---|---|
| CN | 101909346 A | 12/2010 |
| CN | 101951334 A | 1/2011 |
| CN | 101964954 A | 2/2011 |
| CN | 102172078 A | 8/2011 |
| CN | 102326441 A | 1/2012 |
| CN | 103404184 A | 11/2013 |
| CN | 104333888 A | 2/2015 |
| JP | 6-261043 A | 9/1994 |
| JP | 2000-269968 A | 9/2000 |
| JP | 2008-61110 A | 3/2008 |
| JP | 2014-60493 A | 4/2014 |
| KR | 10-2010-0132013 | 12/2010 |
| KR | 10-2015-0109972 | 10/2015 |
| RU | 2 413 389 C2 | 2/2011 |
| RU | 2 477 933 C2 | 3/2013 |
| WO | 2012/118531 A1 | 9/2012 |

OTHER PUBLICATIONS

Combine Russian Federation Office Action and Search Report dated Jan. 2, 2017 in Patent Application No. 2016122393/07 (with English translation of categories of cited documents).
Extended European Search Report dated Mar. 31, 2017 in Patent Application No. 16192780.1.
Joann Zimmerman, et al., "Basic Switch Operation—Ethernet Switches" Ethernet Switches, retrieved from the internet: URL: https://www.safaribooksonline.com/library/view/ethernet-switches/9781449367299/ch01.html, XP055358256, Apr. 1, 2013 pp. 1-14.
Anonymous "Link Layer Topology Discovery (LLTD) Protocol Specification—2" retrieved from the Internet: URL: https://msdn.microsoft.com/en-us/windows/hardware/gg463061.aspx, XP055358739, Aug. 30, 2010, pp. 7-101 with cover pages.
International Search Report dated Jun. 27, 2016 in PCT/CN2015/099602 (submitting English translation only).
International Search Report and Written Opinion dated Jun. 27, 2016 in PCT/CN2015/099602 (with English translation of categories of cited documents).
Office Action dated Jan. 9, 2018 in Japanese Patent Application No. 2016-523954.
Combined Office Action and Search Report dated Apr. 28, 2018 in Chinese Patent Application No. 201510713505.7 (with English translation of categories of cited documents) citing references AA and AO therein, 7 pages.
International Preliminary Report on Patentability and Written Opinion dated May 1, 2018 in PCT/CN2015/099602 (with English language translation), 11 pages.
Office Action dated Apr. 24, 2019, in European Patent Application No. 16 192 780.1 (references AX-AZ cited herein).
Wang et al., "Scatternet Formation and Self-Routing in Bluetooth Networks," pp. 1024, XP055577541, Jan. 2005.
Kapoor et al, "A Zone Routing Protocol for Bluetooth Scatternets," 2003 IEEE Wireless Communications and Networking Conference Record, vol. 3, pp. 1459-1464, XP010639984, Mar. 2003.
Haas et al., "ZRP A Hybrid Framework for Routing in Ad Hoc Networks," Ad Hoc Networking, pp. 225-240, XP055580455, Dec. 2000.
First Office Action issued in Indian Application No. 201637013764 dated Dec. 9, 2019 with English translation, citing reference AO therein, 6 pages.

* cited by examiner

INFORMATION TRANSMISSION METHOD AND APPARATUS, DEVICE AND STORAGE MEDIUM

This application is based on and claims priority of Chinese Patent Application No. 2015107135057, filed on Oct. 28, 2015, the entire contents of which are incorporated herein by reference.

TECHNICAL FIELD

The present disclosure is related to the field of communication technologies, and more particularly, to an information transmission device and apparatus, a device and a storage medium.

BACKGROUND

Owing to the development of mobile Internet technology and the popularization of mobile terminals, data transmission among mobile terminals is on the increase. In related arts, with the WI-FI local area network as an example, data communication or instruction information transmission among terminal devices connected to the WI-FI is realized via a server. Nevertheless, information exchange may be delayed or cannot be realized when a network communication link between the server and the terminal devices is disrupted.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method that includes receiving a message from a source terminal device, the message including message data and a target terminal device identification; determining whether the target terminal device identification exists in a transmission list, the transmission list including identifications of terminal devices accessing an access point device, and the access point device being an access point device corresponding to the source terminal device; and sending the message data to the target terminal device if the target terminal device identification exists in the transmission list.

Before determining whether the target terminal device identification exists in the transmission list, the method includes broadcasting a probe message; receiving first response messages returned by the terminal devices accessing the access point device based on the probe message, the first response messages including terminal device identifications of the corresponding terminal devices; acquiring the terminal device identifications from the first response messages; and adding the acquired terminal device identifications to the transmission list.

The terminal device identifications are media access control (MAC) addresses of the terminal devices.

After broadcasting the probe message, the method includes receiving one or more second response messages returned by other access point devices based on the probe message, the second response messages including access point device identifications of the corresponding access point devices; acquiring the access point device identifications from the second response messages; and adding the acquired access point device identifications to the transmission list.

The method also includes sending a query request to each of the other access point devices in the transmission list when the target terminal device identification does not exist in the transmission list, the query request including the target terminal device identification and being configured to inquire whether the target terminal device has access to the other access point devices; receiving query results returned by the other access point devices; and determining a target access point device to which the target terminal device has access based on the query results and the transmission list.

The method also includes sending the message data to the target access point device to enable the target access point device to forward the message data to the target terminal device.

Aspects of the disclosure also provide an access point device including a processor and a memory configured to store instructions executable by the processor. The processor is configured to receive a message from a source terminal device, the message including message data and a target terminal device identification; determine whether the target terminal device identification exists in a transmission list, the transmission list including identifications of terminal devices accessing an access point device, and the access point device being an access point device corresponding to the source terminal device; and send the message data to the target terminal device if the target terminal device identification exists in the transmission list.

Before determining whether the target terminal device identification exists in the transmission list, the processor is further configured to broadcast a probe message; receive first response messages returned by the terminal devices accessing the access point device based on the probe message, the first response messages including terminal device identifications of the corresponding terminal devices; acquire the terminal device identifications from the first response messages; and add the terminal device identifications to the transmission list.

The terminal device identifications are media access control (MAC) addresses of the terminal devices.

After broadcasting the probe message, the processor is further configured to receive one or more second response messages returned by other access point devices based on the probe message, the second response messages including access point device identifications of the corresponding access point devices; acquire the access point device identifications from the second response messages; and add the acquired access point device identifications to the transmission list.

The processor is further configured to send a query request to each of the other access point devices in the transmission list when the target terminal device identification does not exist in the transmission list, the query request including the target terminal device identification and being configured to inquire whether the target terminal device has access to the other access point devices; receive query results returned by the other access point devices; and determine a target access point device to which the target terminal device has access based on the query results and the transmission list.

The processor is further configured to send the message data to the target access point device to enable the target access point device to forward the message data to the target terminal device.

Aspects of the disclosure also provide a non-transitory computer-readable storage medium having stored therein instructions that, when executed by a processor, cause the processor to perform a method. The method includes receiving a message from a source terminal device, the message including message data and a target terminal device identification; determining whether the target terminal device identification exists in a transmission list, the transmission list including identifications of terminal devices accessing an access point device, and the access point device being an access point device corresponding to the source terminal device; and sending the message data to the target terminal device if the target terminal device identification exists in the transmission list.

The method also includes broadcasting a probe message; receiving first response messages returned by the terminal devices accessing the access point device based on the probe message, the first response messages including terminal device identifications of the corresponding terminal devices; acquiring the terminal device identifications from the first response messages; and adding the terminal device identifications to the transmission list.

The terminal device identifications are media access control (MAC) addresses of the terminal devices.

After broadcasting the probe message, the method includes receiving one or more second response messages returned by other access point devices based on the probe message, the second response messages including access point device identifications of the corresponding access point devices; acquiring the access point device identifications from the second response messages; and adding the other access point device identifications to the transmission list.

The method also includes sending a query request to each of the other access point devices in the transmission list when the target terminal device identification does not exist in the transmission list, the query request including the target terminal device identification and being configured to inquire whether the target terminal device has access to the other access point devices; receiving query results returned by the other access point devices; and determining a target access point device to which the target terminal device has access based on the query results and the transmission list.

The method also includes sending the message data to the target access point device to enable the target access point device to forward the message data to the target terminal device.

It should be understood that both the foregoing general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1:
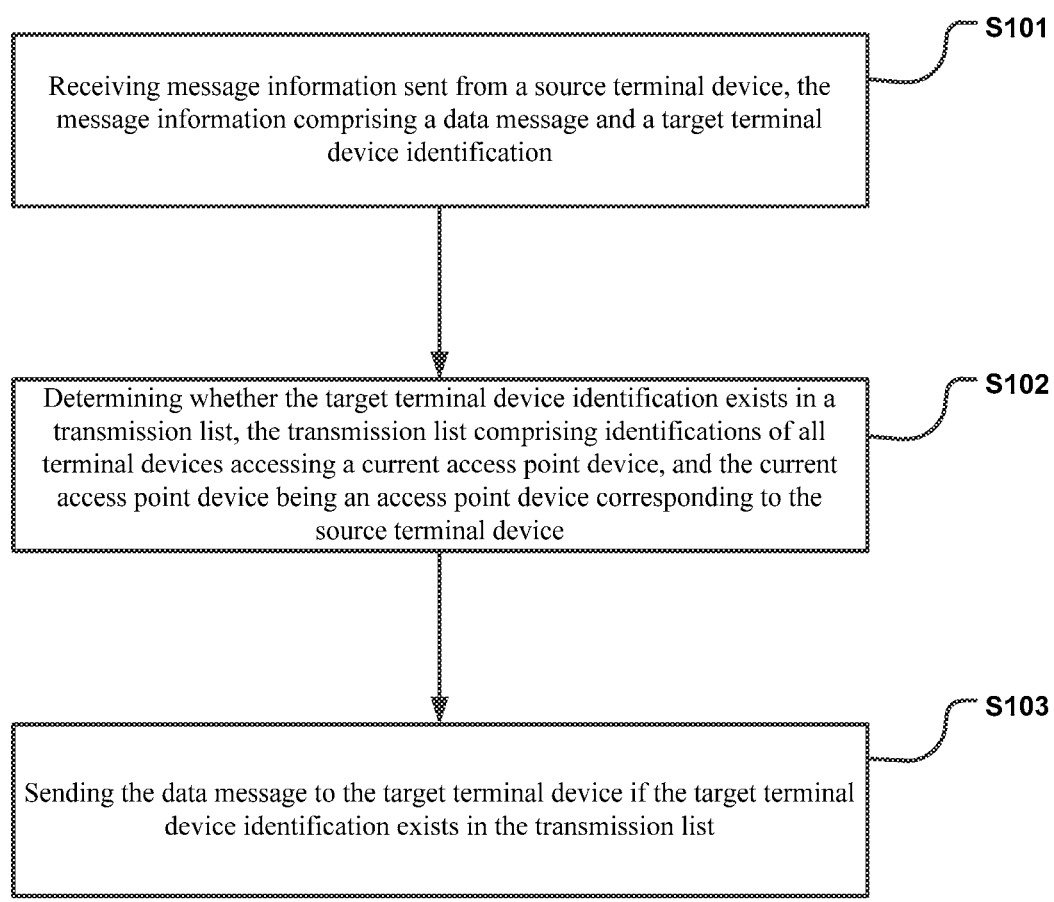
FIG. 1 is a flow chart showing an information transmission method according to an exemplary aspect of the present disclosure.

FIG. 1 is a flow chart showing an information transmission method according to an exemplary aspect. As shown in FIG. 1, the information transmission method is used for an access point device with a data access function, such as a wireless router in a Wi-Fi local area network. The information transmission method comprises the steps as follows.

Step S101, receiving message information sent from a source terminal device, the message information comprising a data message and a target terminal device identification.

The access point device is configured to receive the message information sent from the source terminal device, and send the message information to a target terminal device.

In this step, the access point device firstly receives the message information sent from the source terminal device, the message information contains data information required to be sent and the target terminal device identification, wherein the target terminal device identification can be a media access control (MAC) address of the target terminal device, or other information of the mobile terminal, such as the name, the number or the like.

Step S102, determining whether the target terminal device identification exists in a transmission list, the transmission list comprising identifications of all terminal devices accessing a current access point device, and the current access point device being an access point device corresponding to the source terminal device.

The transmission list is pre-stored in the current access point device, and records identifications of the terminal devices accessing the current access point device. For example, in a Wi-Fi local area network, a transmission list is pre-stored in a wireless router in the Wi-Fi local area network, and records identifications of terminal devices currently accessing the wireless router, such as MAC addresses of a mobile phone, a tablet PC, and the like.

After the current access point device receives the message information sent from the source terminal device and acquires the target terminal device identification in the message information, the target terminal device identification is compared with terminal device identifications in the pre-stored transmission list, if the target terminal device identification in the message information is matched with one identification stored in the transmission list, it can be determined that the target device to which the message information is sent is within the access range of the current access point device.

Step S103, sending the data message to the target terminal device if the target terminal device identification exists in the transmission list.

The current access point device directly sends the message information to the target terminal device when it is determined that the target device to which the message information is sent is within the access range of the current access point device, and there is no need to send the message information to the server.

In the aspect, the transmission list is pre-stored in the current access point device, when the message information required to be sent is sent to a terminal device recorded in the transmission list, it indicates that a sending device and a receiving device for the message information are within an access range of the same access point device, at this time, a local transmission mode is directly adopted, that is, the message information is directly sent to the target terminal device via the access point device, and a procedure in which the message information is sent to the serve to be forwarded in the prior art is eliminated, so that the data transmission efficiency is improved, and moreover, the normal transmission of the message information can be ensured even when the network between the current access point device and the server delays or disconnects. Besides, the transmission list is pre-stored in the current access point device, and during message information sending, what's only needed is to compare the target terminal device identification in the message information with the terminal device identifications in the transmission list, so that a method for judging whether to directly send the message information to the target terminal device is simple and efficient, thereby further ensuring the data transmission efficiency.

Figure 2:
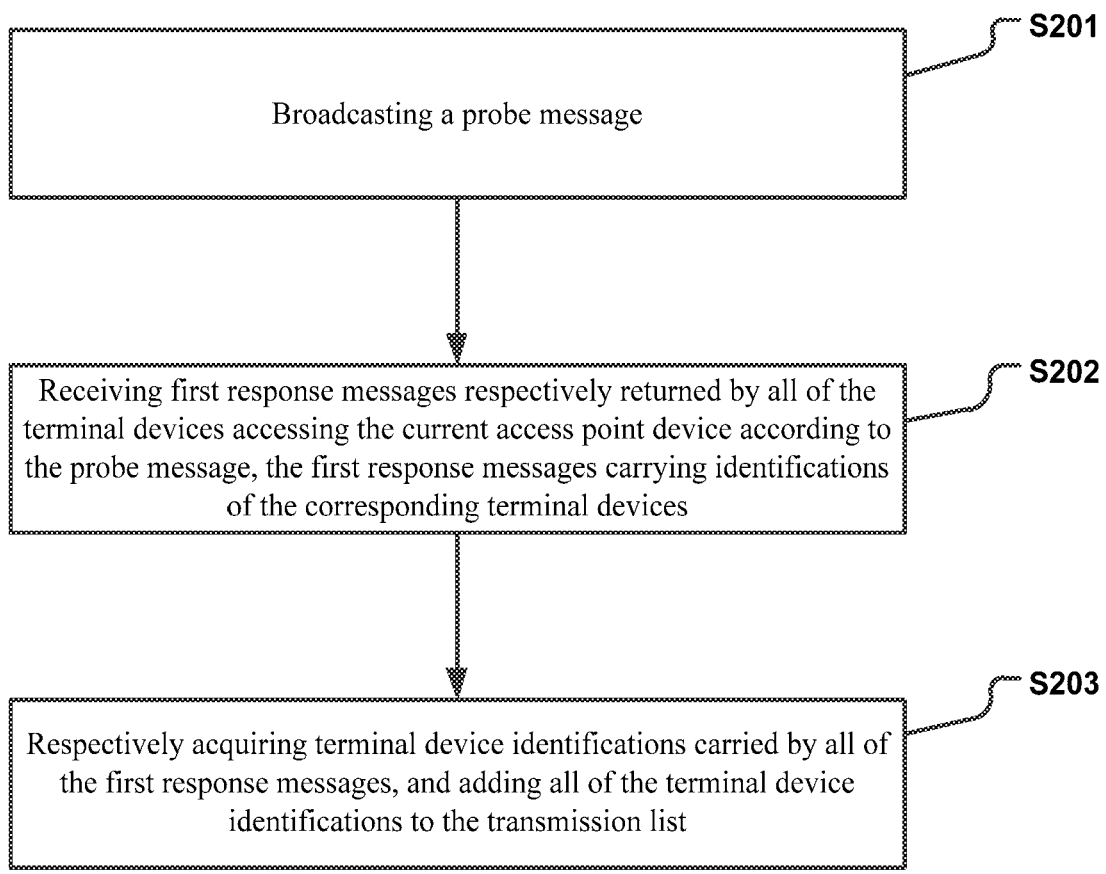
FIG. 2 is a flow chart showing an information transmission method according to another exemplary aspect of the present disclosure.

FIG. 2 is a flow chart showing an information transmission method according to another exemplary aspect. The information transmission method is used for an access point device with a data access function. As shown in FIG. 2, before performing the step S102, the method further comprises the steps as follows.

Step S201, broadcasting a probe message.

The access point device can broadcast the probe message in a periodical, event-triggered or manually-triggered mode, which can be selected according to specific requirements, and the details will not be repeated herein.

Step S202, receiving first response messages respectively returned by all the terminal devices accessing the current access point device according to the probe message, the first response messages carrying identifications of corresponding terminal devices.

After the current access point device broadcasts the probe message, if one terminal device has accessed to the current access point device, it will receive the probe message, and the terminal device identification is returned to the current access point device through a response message.

Wherein, the target terminal device identification can be the media access control (MAC) address, or other information of the mobile terminal, such as the name, the number or the like.

Step S203, respectively acquiring terminal device identifications carried by all of the first response messages, and adding all of the terminal device identifications to the transmission list.

In the step, if the transmission list is empty, the received terminal device identifications are directly added to the transmission list, if the transmission list is not empty, each of the received terminal device identifications is compared with recorded identifications in the transmission list, if the received terminal device identifications do not exist in the transmission list, they are directly added to the transmission list, and if the received terminal device identifications exist in the transmission list, there is no need to add them to the transmission list. Further, if the terminal device corresponding to one identification in the transmission list does not send a response message, it indicates that the terminal device does not access the access point equipment any more, and the identification in the transmission list is deleted.

In the aspect, the terminal device identifications which should be recorded in the transmission list can be determined through broadcasting the probe message and receiving the response messages to ensure that the terminal devices recorded in the transmission list are within the access range of the current access point device, so that the reliability of the transmission list is ensured.

Figure 3:
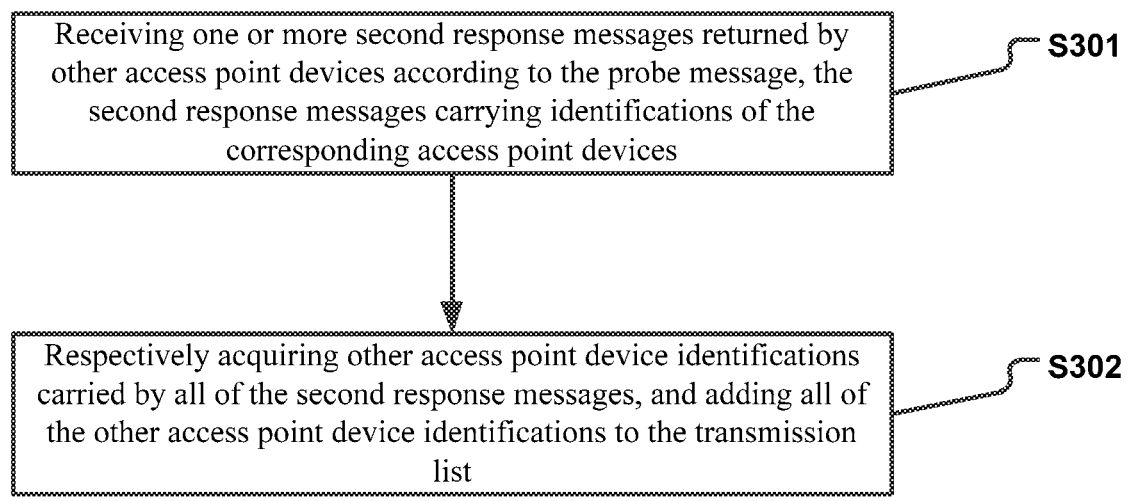
FIG. 3 is a flow chart showing an information transmission method according to another exemplary aspect of the present disclosure.

FIG. 3 is a flow chart showing an information transmission method according to another exemplary aspect. The information transmission method is used for an access point device with a data access function. As shown in FIG. 3, after performing the step S201, the method further comprises the steps as follows.

Step S301, receiving one or more second response messages returned by other access point devices according to the probe message, the second response messages carrying identifications of the corresponding access point devices.

Step S302, respectively acquiring other access point device identifications carried by all of the second response messages, and adding all of the other access point device identifications to the transmission list.

The aspect aims at a scene in which the probe message is received by other access point devices, and under the scene, devices which have received the probe message are not terminal devices, but other access point devices. After receiving the probe message, the other access point devices also may return identifications thereof to the current access point device via response messages. For such scene, after receiving the response messages, the current access point device may also add the other access point device identifications in the response messages to the transmission list, and meanwhile, the current access point device adds type marks to the identifications so as to indicate that the devices corresponding to these identifications are the access point devices, but not terminal devices.

In the aspect, the identifications of the other access point devices capable of receiving the probe message are recorded in the transmission list, so that whether the data transmission adopts a local transmission mode can be determined conveniently in follow-up steps according to the recorded access point device identifications, and therefore, it is helpful to improve the data transmission efficiency.

Figure 4:
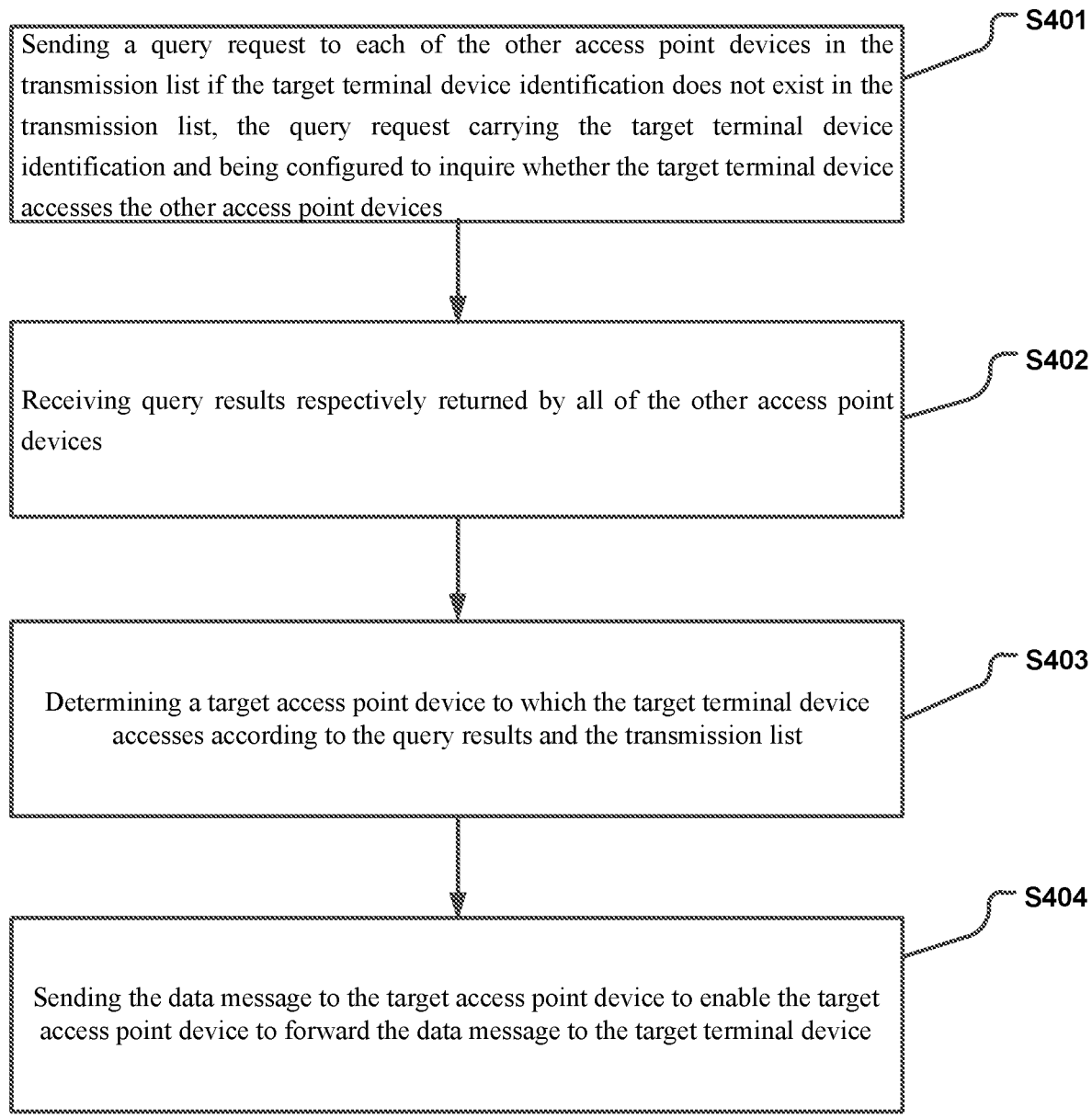
FIG. 4 is a flow chart showing an information transmission method according to another exemplary aspect of the present disclosure.

FIG. 4 is a flow chart showing an information transmission method according to another exemplary aspect. The information transmission method is used for an access point device with a data access function. As shown in FIG. 4, on the basis of adding the other access point device identifications to the transmission list, the method further comprises the steps as follows.

Step S401, sending a query request to each of the other access point devices in the transmission list if the target terminal device identification does not exist in the transmission list, the query request carrying the target terminal device identification and being configured to inquire whether the target terminal device accesses the other access point devices.

The current point device can select out all of the other access point devices recorded in the transmission list according to the type marks, and sends the query request to these access point devices.

Step S402, receiving query results respectively returned by all of the other access point devices.

Step S403, determining a target access point device to which the target terminal device accesses according to the query results and the transmission list.

If a query result is successful, it indicates that the target terminal device has accessed to an access point device which sends the query result, that is, the access point device is the target access point device, and furthermore, address information of the target access point device is acquired from the transmission list.

Step S404, sending the data message to the target access point device to enable the target access point device to forward the data message to the target terminal device.

After the data message is sent to the target access point device, the target access point device may use the methods in the steps S101-S103 or other methods to directly send the data message to the target terminal device, and the data message does not need to be sent to the server to be forwarded.

In the aspect, when the message information required to be sent does not exist in the transmission list, that is, the target terminal device does not access the current access point, the current access point device does not directly send the message information to the server to be forwarded, but sends the query request to the other access point devices recorded in the transmission list to determine whether the target terminal device accesses one of the other access point devices, and if yes, the message information is directly sent to the target terminal device through the other access point device. That is, even though the target terminal device is not in the access range of the current access point device, the local transmission mode can also be used, so that the data transmission efficiency is improved.

Figure 5:
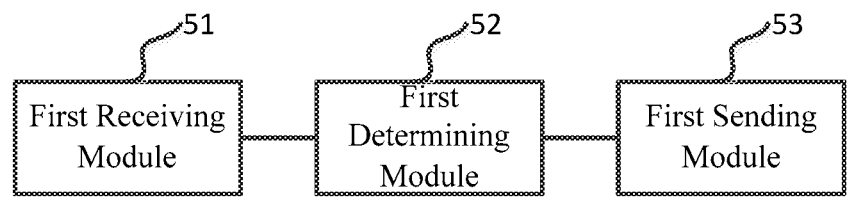
FIG. 5 is a block diagram of an information transmission apparatus according to an exemplary aspect of the present disclosure.

FIG. 5 is a block diagram of an information transmission apparatus according to an exemplary aspect. As shown in FIG. 5, the information transmission apparatus comprises a first receiving module 51, a first determining module 52 and a first sending module 53.

The first receiving module 51 is configured to receive message information sent from a source terminal device, the message information comprising a data message and a target terminal device identification.

The first receiving module 51 is configured to receive the message information sent from the source terminal device, and send the message information to a target terminal device.

The first receiving module 51 firstly receives the message information sent from the source terminal device, wherein the message information contains data information required to be sent and the target terminal device identification, and the target terminal device identification can be a media access control (MAC) address of the target terminal device, or other information of the mobile terminal, such as the name, the number or the like.

The first determining module 52 is configured to determine whether the target terminal device identification received by the first receiving module 51 exists in a transmission list, wherein the transmission list comprises identifications of all terminal devices accessing a current access point device, and the current access point device is an access point device corresponding to the source terminal device.

The transmission list is pre-stored in the current access point device, and records identifications of the terminal devices accessing the current access point device. For example, in a Wi-Fi local area network, a transmission list is pre-stored in a wireless router in the Wi-Fi local area network, and records identifications of terminal devices currently accessing the wireless router, such as MAC addresses of a mobile phone, a tablet PC, and the like.

After the first determining module 52 receives the message information sent from the source terminal device and acquires the target terminal device identification in the message information, the target terminal device identification is compared with terminal device identifications in the pre-stored transmission list, and if the target terminal device identification in the message information is matched with one identification stored in the transmission list, it can be determined that the target device to which the message information is sent is within the access range of the current access point device.

The first sending module 53 is configured to send the data message to the target terminal device when the first determining module determines that the target terminal device identification exists in the transmission list.

The first sending module 53 directly sends the message information to the target terminal device when it is determined that the target device to which the message information is sent is within the access range of the current access point device, and there is no need to send the message information to the server.

In the aspect, the transmission list is pre-stored in the current access point device, when the message information required to be sent is sent to a terminal device recorded in the transmission list, it indicates that a sending device and a receiving device for the message information are within an access range of the same access point device, at this time, a local transmission mode is directly adopted, that is, the access point device directly sends the message information to the target terminal device, and a procedure in which the message information is sent to the serve to be forwarded in the prior art is eliminated, so that the data transmission efficiency is improved, and moreover, the normal transmission of the message information can be ensured even when the network between the current access point device and the server delays or disconnects. Besides, the transmission list is pre-stored in the current access point device, and during message information sending, what's only needed is to compare the target terminal device identification in the message information with the terminal device identifications in the transmission list, so that a method for judging whether to directly send the message information to the target terminal device is simple and efficient, thereby further ensuring the data transmission efficiency.

Figure 6:
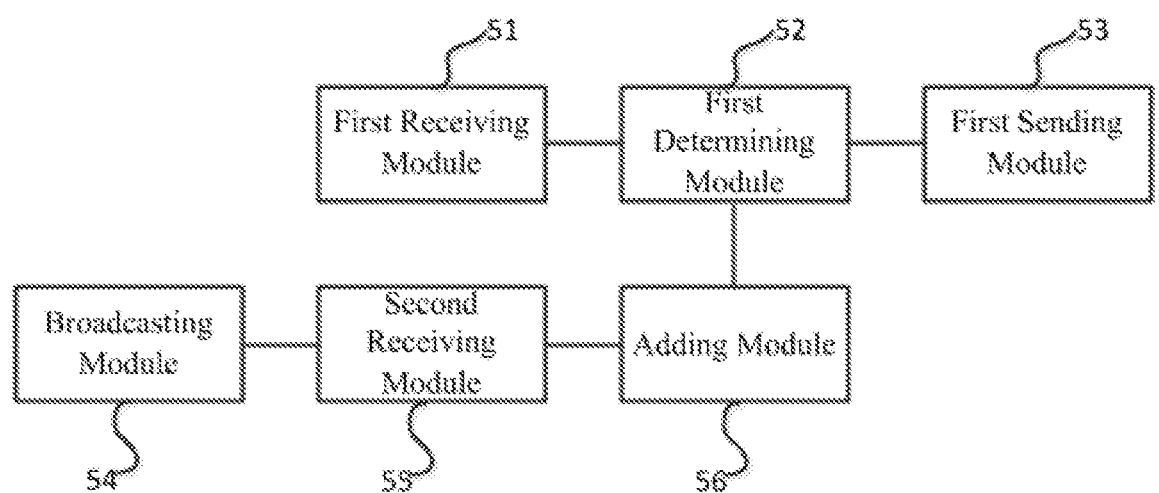
FIG. 6 is a block diagram of an information transmission apparatus according to another exemplary aspect of the present disclosure.

FIG. 6 is a block diagram of an information transmission apparatus according to an exemplary aspect. As shown in FIG. 6, on the basis of the aspect shown in FIG. 5, the information transmission apparatus further comprises a broadcasting module 54, a second receiving module 55 and an adding module 56.

The broadcasting module 54 is configured to broadcast a probe message.

The broadcasting module 54 can broadcast the probe message in a periodical, event-triggered or manually-triggered mode, which can be selected according to specific requirements, and the details will not be repeated herein.

The second receiving module 55 is configured to receive first response messages respectively returned by all the terminal devices accessing the current access point device according to the probe message broadcast through the broadcasting module, the first response messages carrying identifications of the corresponding terminal devices.

After the current access point device broadcasts the probe message, if one terminal device has accessed to the current access point device, the second receiving module 55 can receive a probe message and returns the terminal device identification to the current access point device through a response message.

Wherein, the target terminal device identification can be the media access control (MAC) address, or other information of the mobile terminal, such as the name, the number or the like.

The adding module 56 is configured to respectively acquire the terminal device identifications carried by all of the first response messages received by the second receiving module, and add all of the terminal device identifications to the transmission list.

If the transmission list is empty, the adding module 56 directly adds the received terminal device identifications to the transmission list, if the transmission list is not empty, the adding module 56 enables the received terminal device identifications to be compared with recorded identifications in the transmission list one by one, if the received terminal device identifications do not exist in the transmission list, they are directly added to the transmission list, and if the received terminal device identifications exist in the transmission list, there is no need to add them into the transmission list. Further, if the terminal device corresponding to one identification in the transmission list does not send a response message, it indicates that the terminal device does not access the access point equipment any more, and the adding module 56 deletes the identification from the transmission list.

In the aspect, the terminal device identifications which should be recorded in the transmission list can be determined through broadcasting the probe message and receiving the response messages to ensure that the terminal devices recorded in the transmission list are within the access range of the current access point device, so that the reliability of the transmission list is ensured.

In another aspect, the terminal device identifications are MAC addresses of the terminal devices.

Figure 7:
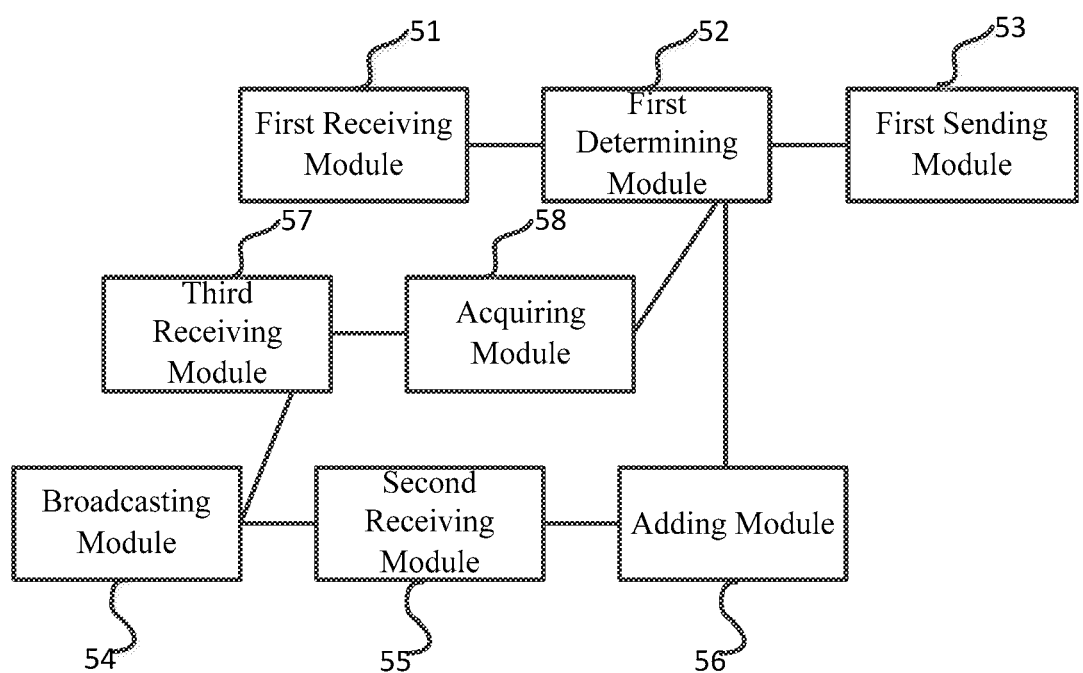
FIG. 7 is a block diagram of an information transmission apparatus according to another exemplary aspect of the present disclosure.

FIG. 7 is a block diagram of an information transmission apparatus according to another exemplary aspect. As shown in FIG. 7, on the basis of the aspect shown in FIG. 6, the information transmission apparatus further comprises a third receiving module 57 and an acquiring module 58.

The third receiving module 57 is configured to receive one or more second response messages returned by other access point devices according to the probe message, the second response messages carrying identifications of the corresponding access point devices.

The acquiring module 58 is configured to respectively acquire other access point device identifications carried by all of the second response messages, and add all of the other access point device identifications to the transmission list.

The aspect aims at a scene in which the probe message are received by the other access point devices, and under the scene, devices which have received the probe message are not terminal devices, but other access point devices. After receiving the probe message, the other access point devices may also return identifications thereof to the current access point device via response messages. For such scene, after the third receiving module 57 receives the response messages, the acquiring module 58 adds the other access point device identifications in the response messages to the transmission list, and meanwhile, the acquiring module 58 adds type marks to the identifications so as to indicate that the devices corresponding to these identifications are the access point devices, but not terminal devices.

In the aspect, the identifications of the other access point devices capable of receiving the probe message are recorded in the transmission list, so that whether the data transmission adopts a local transmission mode can be determined conveniently in follow-up steps according to the recorded access point device identifications, and therefore, it is helpful to improve the data transmission efficiency.

Figure 8:
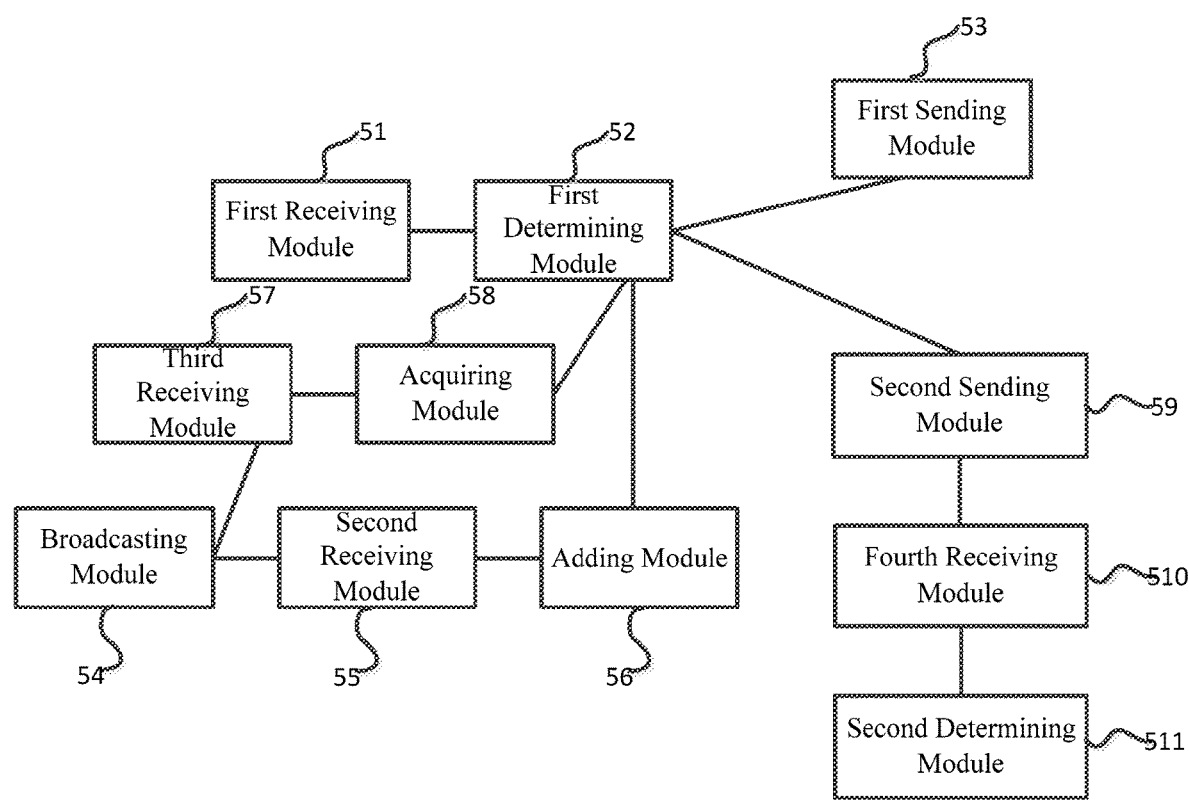
FIG. 8 is a block diagram of an information transmission apparatus according to another exemplary aspect of the present disclosure.

FIG. 8 is a block diagram of an information transmission apparatus according to another exemplary aspect. As shown in FIG. 8, on the basis of the aspect shown in FIG. 7, the information transmission apparatus further comprises a second sending module 59, a fourth receiving module 510 and a second determining module 511.

The second sending module 59 is configured to send a query request to each of the other access point devices in the transmission list if the target terminal device identification does not exist in the transmission list, the query request carrying the target terminal device identification and being configured to inquire whether the target terminal device accesses the other access point devices.

The second sending module 59 can select out all of the other access point devices recorded in the transmission list according to the type marks, and sends the query request to the access point devices.

The fourth receiving module 510 is configured to receive query results respectively returned by all of the other access point devices aiming at the query request sent from second sending module.

The second determining module 511 is configured to determine a target access point device to which the target terminal device accesses according to the query results received by the fourth receiving module and the transmission list.

If a query result is successful, it indicates that the target terminal device has accessed to an access point device which sends the query result, that is, the access point device is the target access point device, and furthermore, the second determining module 511 acquires address information of the target access point device from the transmission list.

In the aspect, when the message information required to be sent does not exist in the transmission list, that is, the target terminal device does not access the current access point, the current access point device does not directly send the message information to the server to be forwarded, but sends the query request to the other access point devices recorded in the transmission list to determine whether the target terminal device accesses one of the other access point devices, and if yes, the message information is directly sent to the target terminal device through the other access point device. That is, even though the target terminal device is not in the access range of the current access point device, the local transmission mode can also be used, so that the data transmission efficiency is improved.

Figure 9:
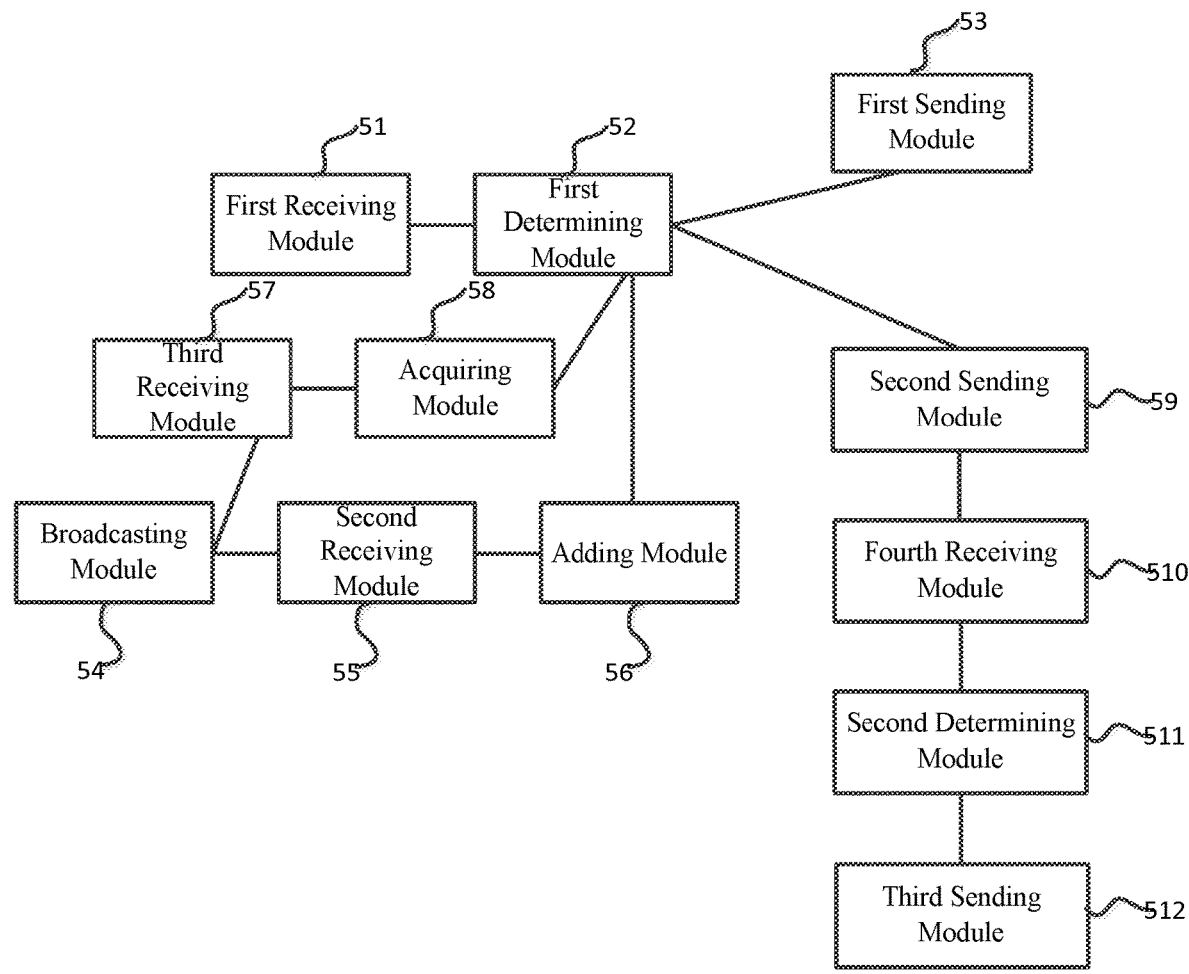
FIG. 9 is a block diagram of an information transmission apparatus according to another exemplary aspect of the present disclosure.

FIG. 9 is a block diagram of an information transmission apparatus according to another exemplary aspect. As shown in FIG. 9, on the basis of the aspect shown in FIG. 8, the information transmission apparatus further comprises a third sending module 512.

The third sending module 512 is configured to send the data message to the target access point device to enable the target access point device to forward the data message to the target terminal device.

After the data message is sent to the target access point device, the target access point device may use the above methods in the steps S101-S103 or other methods to directly send the data message to the target terminal device, and the data message does not need to be sent to the server to be forwarded.

Figure 10:
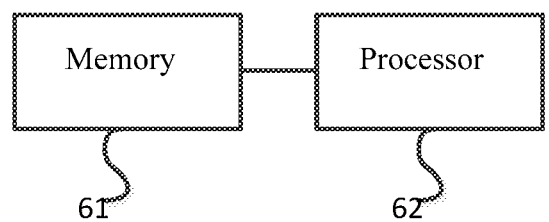
FIG. 10 is a block diagram of an access point device entity according to an exemplary aspect of the present disclosure.

The internal function modules and the schematic structure of the information transmission apparatus are described above, FIG. 10 is a block diagram of an access point device entity according to an exemplary aspect, and as shown in FIG. 10, the access point device comprises a memory 61 and a processor 62.

The memory 61 is configured to store instructions executable by the processor.

The processor 62 is configured to:

receive message information sent from a source terminal device, the message information comprising a data message and a target terminal device identification;

determine whether the target terminal device identification exists in a transmission list, the transmission list comprising identifications of all terminal devices accessing a current access point device, and the current access point device being an access point device corresponding to the source terminal device; and send the data message to the target terminal device if the target terminal device identification exists in the transmission list.

As described above, in the aspect of the information transmission apparatus, it should be understood that the processor may be a central processing unit (CPU), a general processor, a digital signal processor (DSP), an application specific integrated circuit (ASIC), or the like. The general processor may be a microprocessor, or the processor may also be any conventional processor or the like, and the above memory may be a read-only memory (ROM), a random access memory (RAM), a flash memory, a hard disk or a solid state disk. A digital mobile phone is unavailable without a SIM card, also known as a user identification card or a smart card. That is, information of a digital mobile phone customer, an encrypted key, a user's telephone book and other information are stored in a computer chip. The method steps disclosed in conjunction with the present disclosure may be performed and completed by a hardware processor directly, or be performed and completed by combinations of hardware and software modules in the processor.

Figure 11:
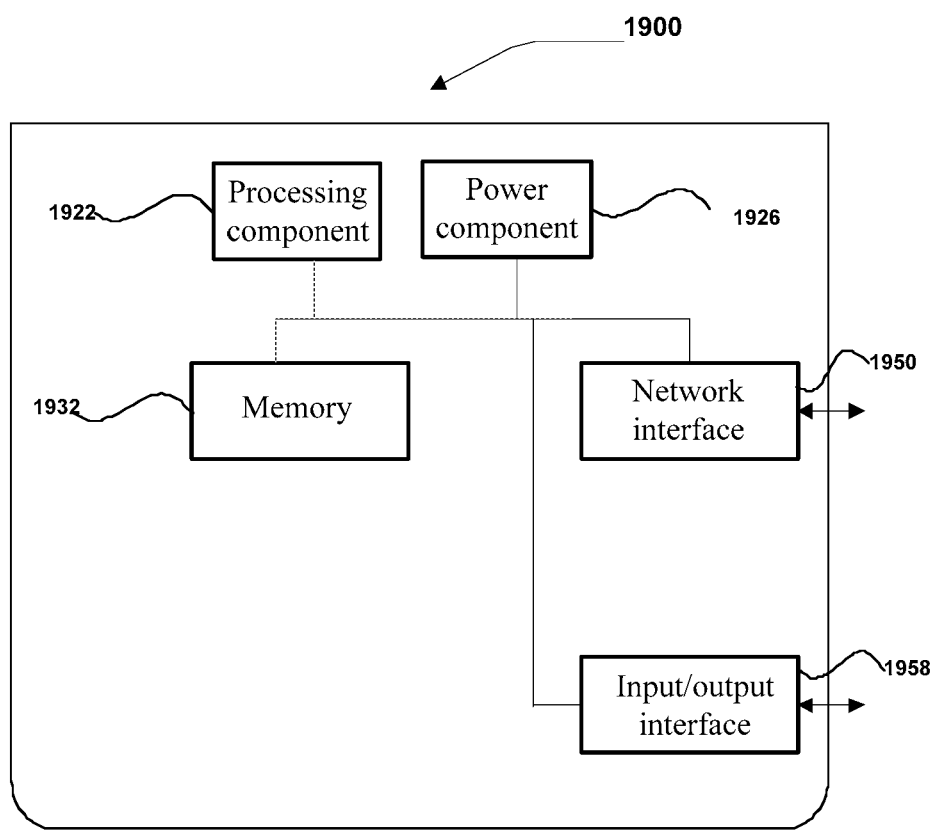
FIG. 11 is a block diagram of an information transmission apparatus 1900 according to an exemplary aspect of the present disclosure.

FIG. 11 is a block diagram of an information transmission apparatus 1900 according to an exemplary aspect. For example, the information transmission apparatus may be a device, such as a wireless router or the like which can provide a data access function.

Referring to FIG. 11, the information transmission apparatus 1900 comprises a processing component 1922, and further comprises one or more processors as well as a memory source represented by a memory 1932 configured to store instructions executable by the processing component 1922, such as an application program. The application program stored in the memory 1932 may comprise one or more modules, each of which corresponds to a group of instructions. Besides, the processing component 1922 is configured to perform the instructions to perform the information transmission method.

The apparatus 1900 may also comprise a power component 1926 configured to perform power management of the apparatus 1900, a wired or wireless network interface 1950 configured to connect the device 900 to a network, and an input/output interface 1958.

The apparatus 1900 may operate an operating system stored in the memory 1932, such as Windows Server™, Mac OS X™, Unix™, Linux™, FreeBSD™ or the like.

In exemplary aspects, the information transmission apparatus 1900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium comprising instructions, such as comprised in the memory 1932, executable by the processing component 1922 in the information transmission apparatus 1900, for performing the above-described methods. For example, the non-transitory computer-readable storage medium may be a read-only memory (ROM), a random-access memory RAM, a CD-ROM, a magnetic tape, a floppy disc, an optical data storage device, and the like.

There is provided a non-transitory computer-readable storage medium, when instructions in the storage medium are executed by the processing component of the information transmission apparatus 1900, the information transmission apparatus 1900 can perform an information transmission method which comprises:

receiving message information sent from a source terminal device, the message information comprising a data message and a target terminal device identification;

determining whether the target terminal device identification exists in a transmission list, the transmission list comprising identifications of all terminal devices accessing a current access point device, and the current access point device being an access point device corresponding to the source terminal device; and sending the data message to the target terminal device if the target terminal device identification exists in the transmission list.

Before determining whether the target terminal device identification exists in the transmission list, the method further comprises:

broadcasting a probe message;

receiving first response messages respectively returned by all the terminal devices accessing the current access point device according to the probe message, the first response messages carrying identifications of the corresponding terminal devices; and respectively acquiring terminal device identifications carried by all of the first response messages, and adding all of the terminal device identifications to the transmission list.

Wherein, the terminal device identifications are MAC addresses of the terminal devices.

After broadcasting the probe message, the method further comprises:

receiving one or more second response messages returned by other access point devices according to the probe message, the second response messages carrying identifications of the corresponding access point devices; and respectively acquiring other access point device identifications carried by all of the second response messages, and adding all of the other access point device identifications to the transmission list.

Wherein, the method further comprises:

sending a query request to each of the other access point devices in the transmission list if the target terminal device identification does not exist in the transmission list, the query request carrying the target terminal device identification and being configured to inquire whether the target terminal device accesses the other access point devices;

receiving query results respectively returned by all of the other access point devices; and determining a target access point device to which the target terminal device accesses according to the query results and the transmission list.

Wherein, the method further comprises:

sending the data message to the target access point device to enable the target access point device to forward the data message to the target terminal device.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method, which is implemented in an access point device in a WiFi local area network, comprising:

receiving, in the WiFi local area network, a message from a source terminal device, the message including message data and a target terminal device identification of a target terminal device;

broadcasting, in the WiFi local area network, a probe message;

receiving, in the WiFi local area network, first response messages respectively returned by all terminal devices accessing the access point device based on the probe message, the first response messages including terminal device identifications of the corresponding terminal devices;

acquiring, in the WiFi local area network, the terminal device identifications from the first response messages;

adding, in the WiFi local area network, the acquired terminal device identifications to a transmission list;

determining, in the WiFi local area network, whether the target terminal device identification exists in the transmission list, the transmission list including identifications of the terminal devices accessing the access point device, and the access point device being accessed by the source terminal device;

determining whether a connection is disrupted between the access point device and a server through which the access point device is configured to send the message data to the target terminal device;

when it is determined that the connection is not disrupted, sending the message data from the access point device to the server that is configured to forward the message data to the target terminal device, and when it is determined that the connection is disrupted and the target terminal device identification exists in the transmission list, sending, in the WiFi local area network, the message data from the access point device directly to the target terminal device so as to avoid delays associated with the disrupted connection with the server.

2. The method of claim 1, wherein the terminal device identifications are media access control (MAC) addresses of the terminal devices.

3. The method of claim 1, wherein after broadcasting the probe message, the method further comprises:

receiving one or more second response messages returned by other access point devices based on the probe message, the second response messages including access point device identifications of the corresponding access point devices;

acquiring the access point device identifications from the second response messages; and adding the acquired access point device identifications to the transmission list.

4. The method of claim 3, further comprising:

sending a query request to each of the other access point devices in the transmission list when the target terminal device identification does not exist in the transmission list, the query request including the target terminal device identification and inquiring whether the target terminal device has access to the other access point devices;

receiving query results returned by the other access point devices; and determining a target access point device to which the target terminal device has access based on the query results and the transmission list.

5. The method of claim 4, further comprising:

sending the message data to the target access point device to enable the target access point device to forward the message data to the target terminal device.

6. An access point device in a WiFi local area network, comprising:

a processor; and a memory configured to store instructions executable by the processor, wherein the processor is configured to:

receive, in the WiFi local area network, a message from a source terminal device, the message including message data and a target terminal device identification of a target terminal device;
broadcast, in the WiFi local area network, a probe message;
receive, in the WiFi local area network, first response messages respectively returned by all terminal devices accessing the access point device based on the probe message, the first response messages including terminal device identifications of the corresponding terminal devices;
acquire, in the WiFi local area network, the terminal device identifications from the first response messages;
add, in the WiFi local area network, the acquired terminal device identifications to a transmission list;
determine, in the WiFi local area network, whether the target terminal device identification exists in a transmission list, the transmission list including identifications of terminal devices accessing the access point device, and the access point device being accessed by the source terminal device;
determine whether a connection is disrupted between the access point device and a server through which the access point device is configured to send the message data to the target terminal device;
when it is determined that the connection is not disrupted, send the message data from the access point device to the server that is configured to forward the message data to the target terminal device, and
when it is determined that the connection is disrupted and the target terminal device identification exists in the transmission list, send, in the WiFi local area network, the message data from the access point device directly to the target terminal device so as to avoid delays associated with the disrupted connection with the server.

7. The device of claim 6, wherein the terminal device identifications are media access control (MAC) addresses of the terminal devices.

8. The device of claim 6, wherein after broadcasting the probe message, the processor is further configured to:
receive one or more second response messages returned by other access point devices based on probe message, the second response messages including access point device identifications of the corresponding access point devices;
acquire the access point device identifications from the second response messages; and
add the acquired access point device identifications to the transmission list.

9. The device of claim 8, wherein the processor is further configured to:
send a query request to each of the other access point devices in the transmission list when the target terminal device identification does not exist in the transmission list, the query request including the target terminal device identification and inquiring whether the target terminal device has access to the other access point devices;
receive query results returned by the other access point devices; and
determine a target access point device to which the target terminal device has access based on the query results and the transmission list.

10. The device of claim 9, wherein the processor is further configured to: send the message data to the target access point device to enable the target access point device to forward the message data to the target terminal device.

11. A non-transitory computer-readable storage medium having stored therein instructions that, when executed by a processor of an access point device in a WiFi local area network, cause the processor to perform a method implemented in the access point device, the method comprising:
receiving, in the WiFi local area network, a message from a source terminal device, the message including message data and a target terminal device identification of a target terminal device;
broadcasting, in the WiFi local area network, a probe message;
receiving, in the WiFi local area network, first response messages respectively returned by all terminal devices accessing the access point device based on the probe message, the first response messages including terminal device identifications of the corresponding terminal devices;
acquiring, in the WiFi local area network, the terminal device identifications from the first response messages;
adding, in the WiFi local area network, the acquired terminal device identifications to a transmission list;
determining, in the WiFi local area network; whether the target terminal device identification exists in a transmission list, the transmission list including identifications of terminal devices accessing the access point device, and the access point device being accessed by the source terminal device;
determining whether a connection is disrupted between the access point device and a server through which the access point device is configured to send the message data to the target terminal device;
when it is determined that the connection is not disrupted, sending the message data from the access point device to the server that is configured to forward the message data to the target terminal device; and
when it is determined that the connection is disrupted and the target terminal device identification exists in the transmission list, sending, in the WiFi local area network, the message data from the access point device directly to the target terminal device so as to avoid delays associated with the disrupted connection with the server.

12. The non-transitory computer-readable storage medium of claim 11, wherein the terminal device identifications are media access control (MAC) addresses of the terminal devices.

13. The non-transitory computer-readable storage medium of claim 11, wherein after broadcasting the probe message, the method further comprises:
receiving one or more second response messages returned by other access point devices based on the probe message, the second response messages including access point device identifications of the corresponding access point devices;
acquiring the access point device identifications from the second response messages; and
adding the other access point device identifications to the transmission list.

14. The non-transitory computer-readable storage medium of claim 13, wherein the method further comprises:
sending a query request to each of the other access point devices in the transmission list when the target terminal device identification does not exist in the transmission list, the query request including the target terminal device identification and inquiring whether the target terminal device has access to the other access point devices;

receiving query results turned by the other access point devices; and determining a target access point device to which the target terminal device has access based on the query results and the transmission list.

15. The non-transitory computer-readable storage medium of claim 14, wherein the method further comprises: sending the message data to the target access point device to enable the target access point device to forward the message data to the target terminal device.

* * * * *